March 27, 1951 N. ZIGTERMAN 2,546,843
STORM AND INSECT NETTING SHIELD FOR BABY CARRIAGES
Filed June 11, 1948 2 Sheets-Sheet 1
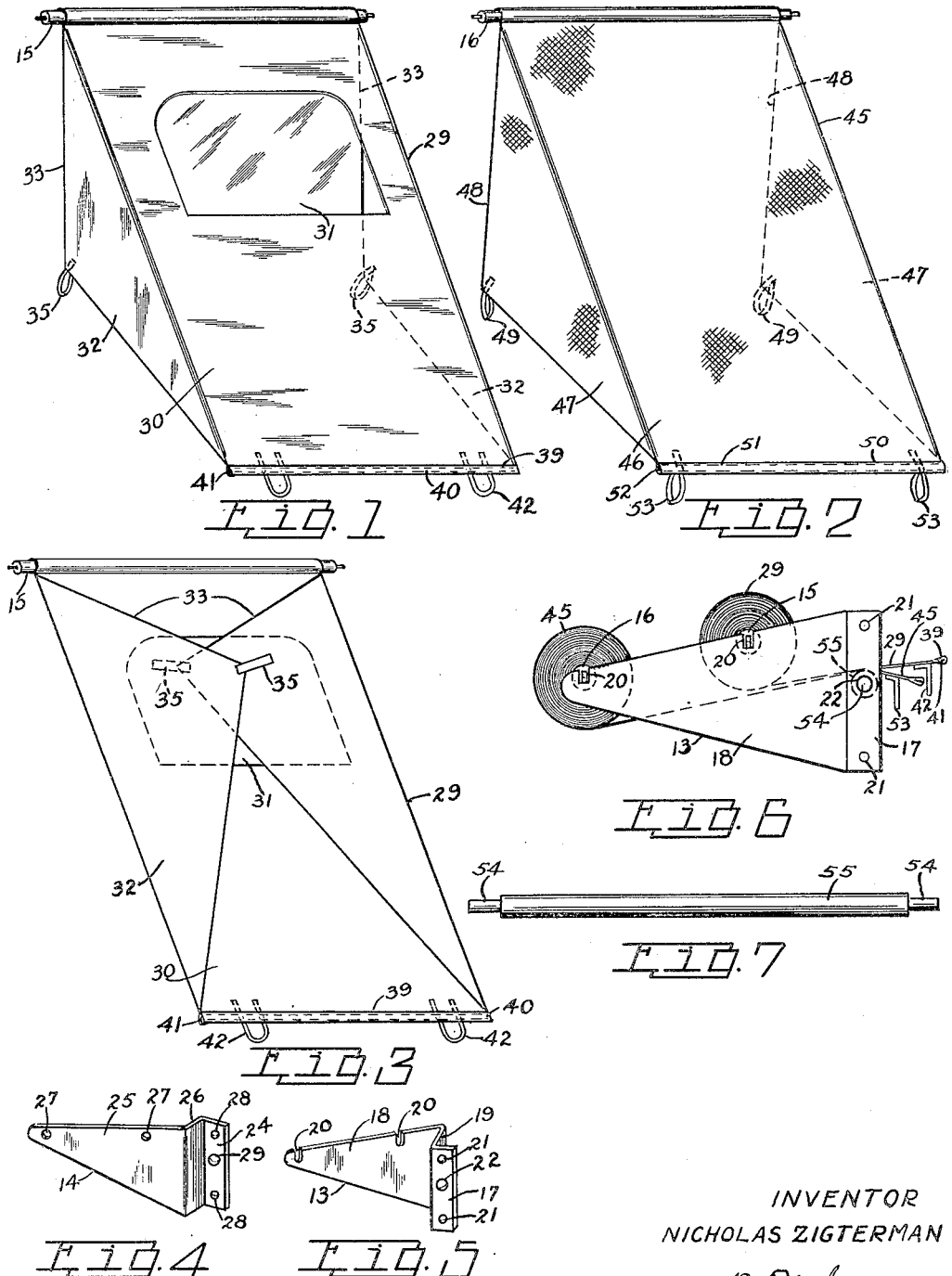
INVENTOR
NICHOLAS ZIGTERMAN
BY J. B. Dickman Jr.
ATTORNEY March 27, 1951 N. ZIGTERMAN 2,546,843

STORM AND INSECT NETTING SHIELD FOR BABY CARRIAGES

Filed June 11, 1948 2 Sheets-Sheet 2

INVENTOR
NICHOLAS ZIGTERMAN
BY J.B.Dickman, Jr.
ATTORNEY

Patented Mar. 27, 1951

2,546,843

UNITED STATES PATENT OFFICE 2,546,843

STORM AND INSECT NETTING SHIELD FOR BABY CARRIAGES

Nicholas Zigterman, Highland, Ind.

Application June 11, 1948, Serial No. 32,443

4 Claims. (Cl. 5—364)

The present invention relates to combined storm and insect netting shields for baby carriages.

In the present day baby carriage no equipment is provided to protect a baby in a carriage from sudden storms, such as wind or rain, and or from insects. It is the usual practice in protecting a baby in a carriage from insects, to throw a cheese-cloth netting loosely over a carriage. This method has its disadvantages, in that, if not tied down a wind may blow it off or a baby may pull it off, of a carriage, or the netting may be lost.

It is an object of the present invention to provide both a storm and an insect netting for baby carriages.

Another object of the present invention is the provision for housing a storm shield and insect netting compactly in a baby carriage.

A still further object of the present invention is the provision of means for securing a storm or insect netting to a baby carriage.

A still further object of the present invention is the provision of means for locking storm and insect netting on a baby carriage when not in use.

A still further object of the present invention is the provision of means for supporting storm and insect netting shields in a baby carriage.

With the foregoing and other objects in view which will appear as the description proceeds, the invention consists of certain novel details of construction and combination of parts hereinafter more fully described and claimed, it being understood that changes may be made in the construction and arrangement of parts without departing from the spirit of the invention as claimed.

In the drawings:

Figure 1 is a perspective view of a shield mounted on a roller.

Figure 2 is a perspective view of a reticulated shield mounted on a roller.

Figure 3 is a perspective view of Figure 1 and showing the side flaps folded.

Figure 4 is a perspective view of one type of bracket.

Figure 5 is a perspective view of another type of bracket.

Figure 6 is a side elevational view showing the shield and reticulated shield positioned in the brackets.

Figure 7 is a view of a rod that is positioned between the brackets.

Figure 8:
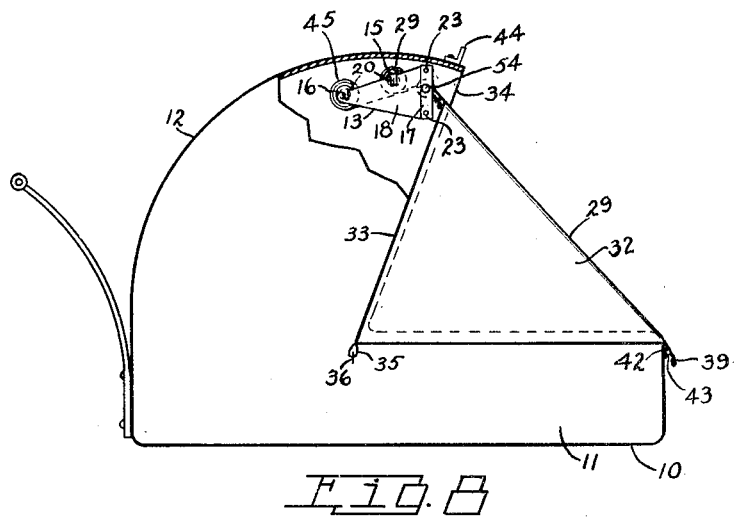
Figure 8 is a side elevational view of the body of a baby carriage a portion of the hood being broken away showing the brackets that support the rollers upon which is rolled the storm shield and netting shield, the storm shield being shown in operative or cover position.

In the drawings the numeral 10 represents a baby carriage having a body 11 and a hood 12. Within the hood 12 there are mounted brackets 13 and 14 that support rollers 15 and 16 that are of the roller shade type and well known in the art. I wish to have it understood that the mounting in the hood is one illustration, the brackets and rollers may be mounted in the foot of the body of the carriage, if desired. Bracket 13 is provided with a flange 17 that is offset from the arm 18 by portion 19 that is disposed at right-angles to the arm 18. The arm 18 is provided with slots 20 that receive the ends of rollers 15 and 16, and the flange 17 with apertures 21 and a large aperture 22, the apertures 21 receiving rivets 23 that secure the bracket to one side of the hood 12. The bracket 14 is provided with a flange 24 that is offset from the arm 25 by portion 26 that is disposed at right-angles to the arm 25, the portion 26 and flange 24 being in opposed relation to portion 19 and flange 17 of arm 18. The arm 25 is provided with apertures 27 that receive the opposite end of rollers 15 and 16, the flange 24 with apertures 28 and a large aperture 29, the apertures 28 receiving rivets for securing the bracket to the opposite side of the hood 12.

The brackets 13 and 14, if desired may be mounted in the hood so that the flanges 17 and 24 would be near the vertical edges of the hood 12 with the ends 54 of the stick 55 free of the side edges of the hood.

Figure 9:
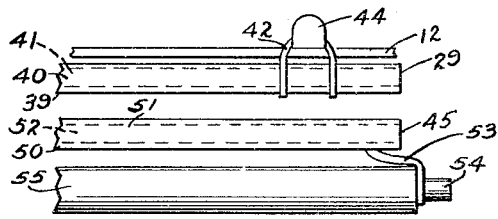
Figure 9 is an enlarged fragmentary distorted front elevational view showing the relative position of the rod, the end of the shield and the end of the netting when rolled up and housed in the hood of a baby carriage, the end of the netting being anchored to the rod by loops, the end of the shield being anchored to the brackets on the hood of the carriage.
Figure 10:
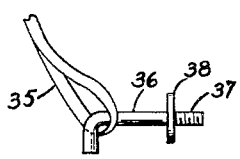
Figure 10 is a side elevational view of one of the hooks and showing one of the loops in engagement therewith, the loops being shown fragmentarily.
Figure 11:
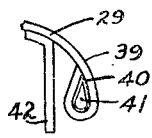
Fig. 11 is a side elevational view of the lower end of the shield and illustrating the pocket for the stick and the loop on the shield, the shield being shown fragmentary.

Upon roller 15 is wound a weather repellent shield 29 illustrated in Figures 1 and 3, and this shield comprises a top portion 30 having a window 31 of a clear suitable flexible material, and side flaps 32. The side edges 33 of the flaps 32 may be cut at any desired angle to fit the various angles at which the side edges 34 of the hood 12 may be disposed. The side flaps 32 are provided with loops 35 of elastic or other suitable material and these loops engage hooks 36 (illustrated in Figure 10), to hold the flaps down. As shown in Figure 10 the hook has a threaded shank 37 and a flange 38, the threaded portion adapted to receive a nut or other suitable means for securing the shank to the carriage. The end portion 39 of the shield 29 is provided with a pocket 40 that houses a stick 41 to assist in keeping the top portion 30 in a flat position and also to give supporting strength to the shield. The bottom of the shield is provided with loops 42 that may be of elastic or other suitable material and these loops engage hooks 43 that are similar to hooks 36 when the shield is drawn to operative position, and when rolled up the loops engage projections 44 on the top of the hood 12, one being shown in the drawings, Figures 8 and 9. As shown in Figure 3, the flaps 32 are folded on the portion 30 when the shield 29 is to be rolled up and out of the way.

Upon roller 16 is wound a netting shield 45 illustrated in Figure 2 and this shield may be of any suitable reticulated material, and it comprises a flat portion 46 and side flaps 47, the edges 48 may be cut at any desired angle to fit the various angles at which the sides 34 of the hood 12 may be disposed. The side flaps 47 are provided with loops 49 of elastic or other suitable material and these loops engage the hooks 36 to hold the flaps down. The lower end 50 of the shield 45 is provided with a pocket 51 that houses a stick 52 to assist in keeping the top portion 46 in a flat position and also to give supporting strength to the netting shield. The bottom of the netting shield 46 is provided with loops 53 and these loops engage hooks 43 when the netting shield is drawn to operative position, and when rolled up these loops engage the ends 54 of the stick 55 as shown in Figure 9. The stick 55 is interposed between the flanges 17 and 24 respectively of brackets 13 and 14, the ends 54 extending through apertures 22 and 29.

In the operation of the device and as illustrated in Figure 8, the shield 29, if it is raining, snowing or if the wind is blowing, is pulled down, loops 35 engaging the hooks 36 and loops 42 engaging hooks 43. When not in use the flaps 32 are folded as shown in Figure 3, the shield rolled upon roller 15 loops 42 engaging projections 44.

When it is desired to use the netting shield 45, the shield is drawn down and loops 49 are engaged with hooks 36 and loops 53 are engaged with hooks 43. When not in use the flaps 47 are folded in the same manner as flaps 32 and the netting shield rolled upon roller 16, loops 53 engaging ends 54 of the stick 55.

Obviously, modifications in the form and construction of the several parts may be made without departing from the spirit and scope of the present invention as defined in the appended claims.

What is claimed is:

1. In combination with a baby carriage shield support means mounted in said carriage, rollers mounted in said support means, and protective shields for said carriage carried by said rollers.

2. In combination with a baby carriage shield support means mounted in said carriage, rollers mounted in said support means, protective shields carried by said rollers, securing means for said shields carried by said carriage, and means on said shields engageable with said securing means on said carriage.

3. In combination with a baby carriage shield support means mounted in the top of said carriage, rollers mounted in said support means, protective shields carried by said rollers, securing means for said shields carried by said carriage, and means carried by said shields engageable with said securing means carried by said carriage.

4. In combination with a baby carriage shield support means mounted in the top of said carriage, rollers mounted in said support means, protective shields carried by said rollers, securing means for said shields carried by said carriage, and securing means for one of said shields carried by said support means.

NICHOLAS ZIGTERMAN.

REFERENCES CITED

The following references are of record in the file of this patent:

UNITED STATES PATENTS

| Number | Name | Date |
|---|---|---|
| 778,330 | Pond | Dec. 27, 1904 |
| 860,379 | Hodes | July 16, 1907 |
| 1,732,878 | Collender | Oct. 22, 1929 |